(12) United States Patent
van Blokland

(10) Patent No.: US 9,307,773 B2
(45) Date of Patent: Apr. 12, 2016

(54) DEVICE FOR CUTTING DOUGH

(71) Applicant: Rademaker B.V., Culemborg (NL)

(72) Inventor: Johannes Josephus Antonius van Blokland, Beusichem (NL)

(73) Assignee: Radie B.V., Culemborg (NL)

( * ) Notice: Subject to any disclaimer, the term of this patent is extended or adjusted under 35 U.S.C. 154(b) by 191 days.

(21) Appl. No.: 13/772,532

(22) Filed: Feb. 21, 2013

(65) Prior Publication Data

US 2013/0283988 A1    Oct. 31, 2013

(30) Foreign Application Priority Data

Mar. 2, 2012   (EP) .................................... 12157944

(51) Int. Cl.
| | |
|---|---|
| *A21C 11/10* | (2006.01) |
| *A21C 5/00* | (2006.01) |
| *B26D 1/56* | (2006.01) |
| *B26D 1/60* | (2006.01) |
| *B26D 5/16* | (2006.01) |
| *B26D 1/08* | (2006.01) |
| *B26D 5/14* | (2006.01) |

(52) U.S. Cl.
CPC . *A21C 11/10* (2013.01); *A21C 5/00* (2013.01); *B26D 1/56* (2013.01); *B26D 1/60* (2013.01); *B26D 1/08* (2013.01); *B26D 5/14* (2013.01); *B26D 5/16* (2013.01); *Y10T 83/6656* (2015.04)

(58) Field of Classification Search
CPC ... Y10T 83/887; Y10T 83/8871; Y10T 83/87; Y10T 83/8699; Y10T 83/8693; A21C 11/00; A21C 11/004; A21C 11/10
USPC ............. 83/437.1, 932, 527, 536–538, 356.2, 83/642, 643, 646, 315, 318–320
See application file for complete search history.

(56) References Cited

U.S. PATENT DOCUMENTS

| | | | | |
|---|---|---|---|---|
| 1,726,369 A | * | 8/1929 | Smith | ............................. 83/388 |
| 2,155,396 A | * | 4/1939 | Borzym | ................. B23D 25/04 |
| | | | | 192/24 |
| 2,206,312 A | | 7/1940 | Werner | |
| 2,591,256 A | * | 4/1952 | Hart | ........................ A21C 11/10 |
| | | | | 83/318 |
| 2,802,431 A | | 8/1957 | Hoagland et al. | |
| 3,530,755 A | * | 9/1970 | Gugler | ............................ 83/355 |
| 4,442,131 A | * | 4/1984 | Nagy | ........................ A21C 5/00 |
| | | | | 425/287 |

(Continued)

FOREIGN PATENT DOCUMENTS

| | | |
|---|---|---|
| DE | 280510 | 11/1914 |
| DE | 736077 | 6/1943 |
| WO | 2009091247 A1 | 7/2009 |

*Primary Examiner* — Ned Landrum
*Assistant Examiner* — Richard Crosby, Jr.
(74) *Attorney, Agent, or Firm* — The Webb Law Firm

(57) ABSTRACT

The present invention relates to a device for cutting dough, including, a conveyor for conveying an elongated or endless dough piece in an essentially horizontal direction; a slide, arranged translatable in the essentially horizontal direction of conveyance of the conveyor, a cutting blade, extending horizontally and essentially perpendicular to the direction of conveyance of the conveyor, and coupled to the slide, translatable in an essentially vertical direction, a moment, having an arm extending essentially vertically, with a first arm part extending above a fulcrum, and a second arm part extending below the fulcrum, the first arm part coupled to the slide, and the second arm part coupled to a first drive for rocking the arm about the fulcrum, and a second drive, for translating the cutting blade in the essentially vertical direction with respect to the slide.

15 Claims, 4 Drawing Sheets

(56) References Cited

U.S. PATENT DOCUMENTS

| | | | | |
|---|---|---|---|---|
| 4,854,205 A | * | 8/1989 | Anderka | 83/529 |
| 5,052,267 A | * | 10/1991 | Ino | 84/613 |
| 6,799,497 B1 | * | 10/2004 | Creighton et al. | 83/643 |
| 7,153,203 B2 | * | 12/2006 | Pfarr et al. | 452/150 |
| 2013/0000454 A1 | * | 1/2013 | Miller | 83/37 |

* cited by examiner

DEVICE FOR CUTTING DOUGH

BACKGROUND OF THE INVENTION

1. Field of the Invention

The present invention relates to a device for cutting dough. More in particular, to a device for cutting elongated or even endless dough pieces, that are transferred on a conveyor.

2. Description of Related Art

For processing elongated and in particular endless dough pieces, it is known to use a cutting blade that is oriented perpendicular or at an angle to a direction of conveyance of the dough. In general, the dough is converted in a horizontal direction, and the cutting blade, also referred to as guillotine, is repeatedly moving up and down in a vertical direction.

When the conveyance speed is relatively low, the interaction of the cutting blade and the dough is so short, that the dough hardly moves horizontally during one single cut. But modern bakery processes and quantities require optimization to the highest speeds of conveyance possible. Moreover, the demand for small products increases, either for use as snacks, or because of a grown health awareness. The smaller or shorter the product, the more cuts are required per amount of movement of the conveyor. Thick products result in a relative long interaction time between the cutting blade and the product.

In order to avoid the cutting blade to damage the dough, by tearing it or by blocking it when cutting, it is known in the art to have a cutting blade or guillotine that moves with at least a speed component in the direction of movement of the dough. This may be a rotating cutting blade, or a cutting blade or guillotine arranged on a slide, that moves along with the dough.

German patent DE 736077 discloses a dough-cutting machine wherein the moment of cutting depends on the speed of a conveyor belt and the amount of cutting members. The cutting member is arranged to move up and down upon rotation of a driving member.

Although these devices fulfil a certain need, they still have multiple disadvantages. In particular, it has appeared difficult to synchronize the speed of the cutting blade with the horizontal movement of the conveyor, in particular for high cutting frequencies and/or short products. Furthermore, adjustment of the exact length of the product has required mechanical changes to the machine or its configuration, rendering a change of setting, for instance when another product is required, cumbersome.

SUMMARY OF THE INVENTION

It is a goal of the present invention to provide a device for cutting dough, in particular at high speeds, that takes away the above disadvantages, or at least provides a useful alternative to the state of the art.

The invention thereto proposes a device for cutting dough, comprising a conveyor for conveying an elongated or endless dough piece in a direction with at least a horizontal component, a slide, arranged translatable in the direction of conveyance of the conveyor, a cutting blade, coupled to the slide, translatable in an essentially vertical direction, an arm extending essentially vertically, with a first arm part extending above a fulcrum, and a second arm part extending below the fulcrum, the first arm part coupled to the slide, and the second arm part coupled to a first drive for rocking the arm about the fulcrum, a second drive, for translating the cutting blade in the essentially vertical direction with respect to the slide, wherein the vertical position of the fulcrum is adjustable, with respect to the coupling of the first part of the arm to the slide, and/or with respect to the coupling of the second part of the arm and the drive.

The device according to the invention is for cutting dough while the dough is being conveyed, and thereto comprises a conveyor which may form part of a dough line, or be arranged in-line with a dough line. In particular, the direction of conveyance of the dough may be horizontal. In order to avoid damaging the dough by the cutting blade, the latter is arranged on a slide, that is moved in a horizontal direction. For that purpose, an arm is provided, extending essentially vertically, with a first arm part extending above a fulcrum, and a second arm part extending below the fulcrum, the first arm part coupled to the slide, and the second arm part coupled to a first drive for rocking the arm about the fulcrum.

The cutting blade may be a straight blade, extending horizontally and essentially perpendicular to the direction of conveyance of the conveyor, but may also comprise one or more specifically formed parts, in order to cut out specific forms of dough.

By rocking the second arm part of the arm, the first arm part is rocked instantaneously, be it in the opposite direction. This rocking motion is used to move the slide in a horizontal direction, alternatingly parallel respectively anti-parallel to the direction of movement of the dough. Meanwhile, a second drive is used for translating the cutting blade in the essentially vertical direction with respect to the slide. The first and second drive are synchronized such that the cutting blade travels along with the dough when it is in contact with the dough, and is lifted when it moves against the direction of dough conveyance.

The distance of the horizontal movement of the slide and thus of the cutter is determined by the relative proportions of the first arm part and the second arm part, and the distance over which the second arm part is moved, the latter being constant for the simplicity of the construction. According to the invention, the vertical position of the fulcrum is adjustable, with respect to the coupling of the first part of the arm to the slide, and/or with respect to the coupling of the second part of the arm and the drive. By changing this vertical position, the relative length of the first and second arm part can be influenced, and thus the distance of horizontal movement of the slide, which is proportional to the length of a product to be cut.

With respect to the prior art, the invention offers the advantage of being easily adjustable, without requiring a change in its mechanical configuration, and even the advantage of being adjustable in use, that is, while cutting dough. The device is in particular advantageous for cutting relatively high dough products, for instance chocolate or meat filled dough products, with heights up to several centimeters. In order to be able to cut dough in pieces with every desired length within certain boundaries, the vertical position of the fulcrum may be steplessly adjustable. The vertical position can be adjustable by an actuator, such as a controllable adjusting spindle, which actuator may comprise an electric motor.

In an embodiment, the vertical position of the fulcrum is adjustable by lifting a frame in which the arm is beared rotatably about the fulcrum. The position of the fulcrum is then changed with respect to the height at which the first arm part is coupled to the slide, and optionally also to the height to which the second arm part is coupled to the drive for rocking the arm. In the latter case, the relative length and thus the amount of horizontal movement of the slide is more sensitive to changes in the vertical position of the fulcrum.

For enabling the position at which the first arm part is coupled to the slide to change, the first arm part may be coupled to the slide by means of a guide bearing. For the same reason, the drive for rocking the arm may comprise an eccentric cam, wherein the second arm part is coupled to the cam also by a guide bearing. These guide bearings may in a simple embodiment be formed by a slit in the arm, but separate bearings such as a rail may be applied too.

An efficient construction that guarantees a frequency-synchronization between the horizontal and vertical alternating movements of the cutting blade, is obtained when the drive for rocking the arm is the drive for translating the cutting blade in the essentially vertical direction. Said drive for translating the cutting blade may for instance comprise an eccentric cam, coupled to the cutting blade by means of a rod. The eccentric cam may be arranged on the same shaft as the eccentric cam for rocking the second arm part.

In a further embodiment, the drive is balanced, for compensating the inertia of a horizontal and/or vertical movement. In particular when cutting at relative high speeds (multiple cuts per second), the inertia of the moving parts may become so high that the device starts to resonate, or even falls. This goes in particular for horizontal resulting forces, but also vertical forces may cause the apparatus to jump on or from its place. Balancing may be done with counter-weights, and/or additionally with a second arm, for counterbalancing at least a horizontal component of the inertia of the first moment. In particular, the second moment may be configured to make synchronous but opposite movements with respect to the first arm. Thereto, the first and the second arm may be essentially same-shaped.

In order to ease the use of the device, and to facilitate incorporation in a dough line, the device may comprise a controller, for controlling the first and/or second drive, the controller configured for setting the drive at uninterrupted movement. In particular, the controller may be configured for setting at least the second drive to translate the cutting blade in the essentially vertical direction with a frequency above 150 cuts/minute, and more in particular more than 200 cuts/minute, and especially between 250 and 300 cuts/minute. The controller may further be configured for setting the speed of conveying the dough piece in horizontal direction to the speed of the horizontal speed component of the slide.

BRIEF DESCRIPTION OF THE DRAWINGS

The invention will now be elucidated into more detail, with reference to the following figures. Herein.

DESCRIPTION OF THE INVENTION

Figure 1A:
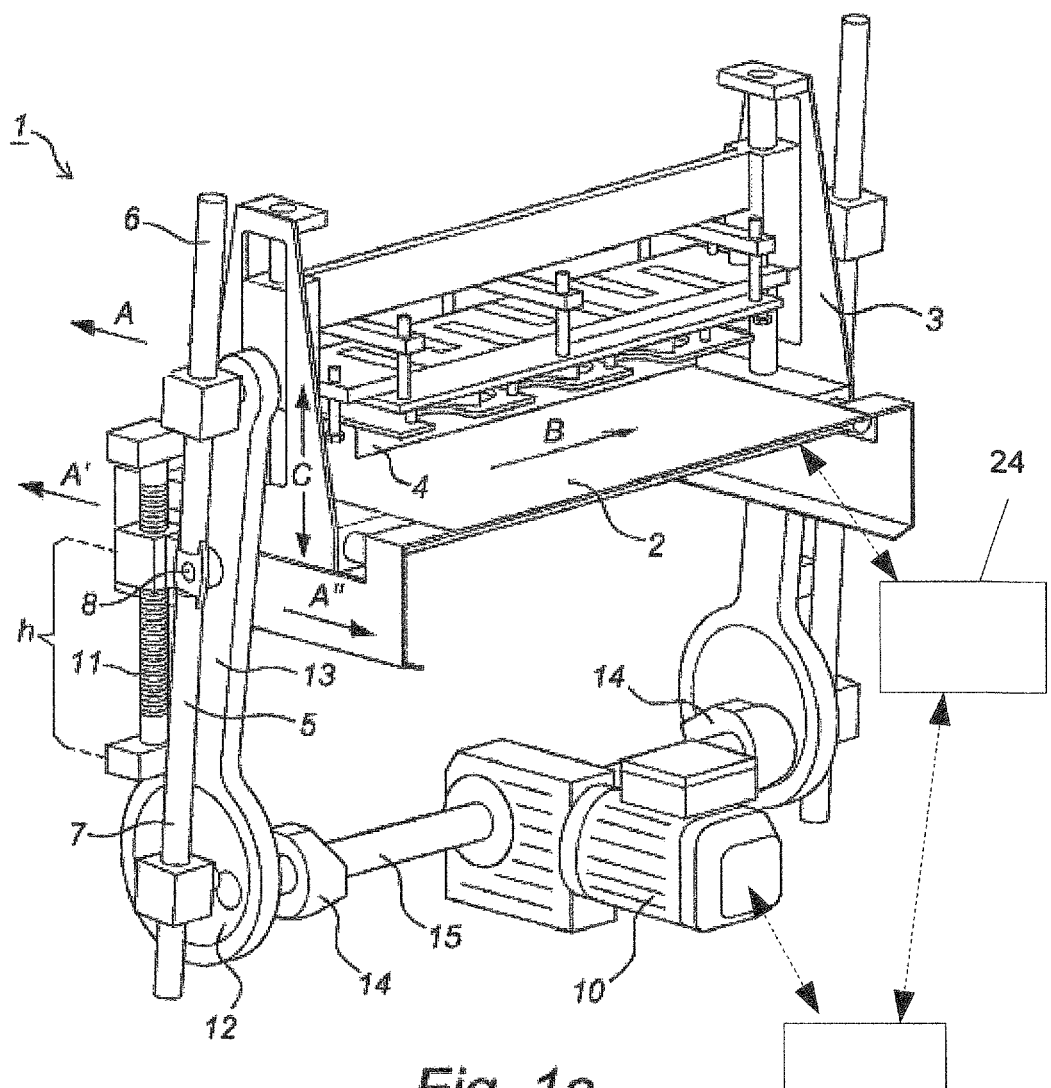
FIG. 1a shows a perspective view of relevant parts of a first embodiment.
Figure 1B:
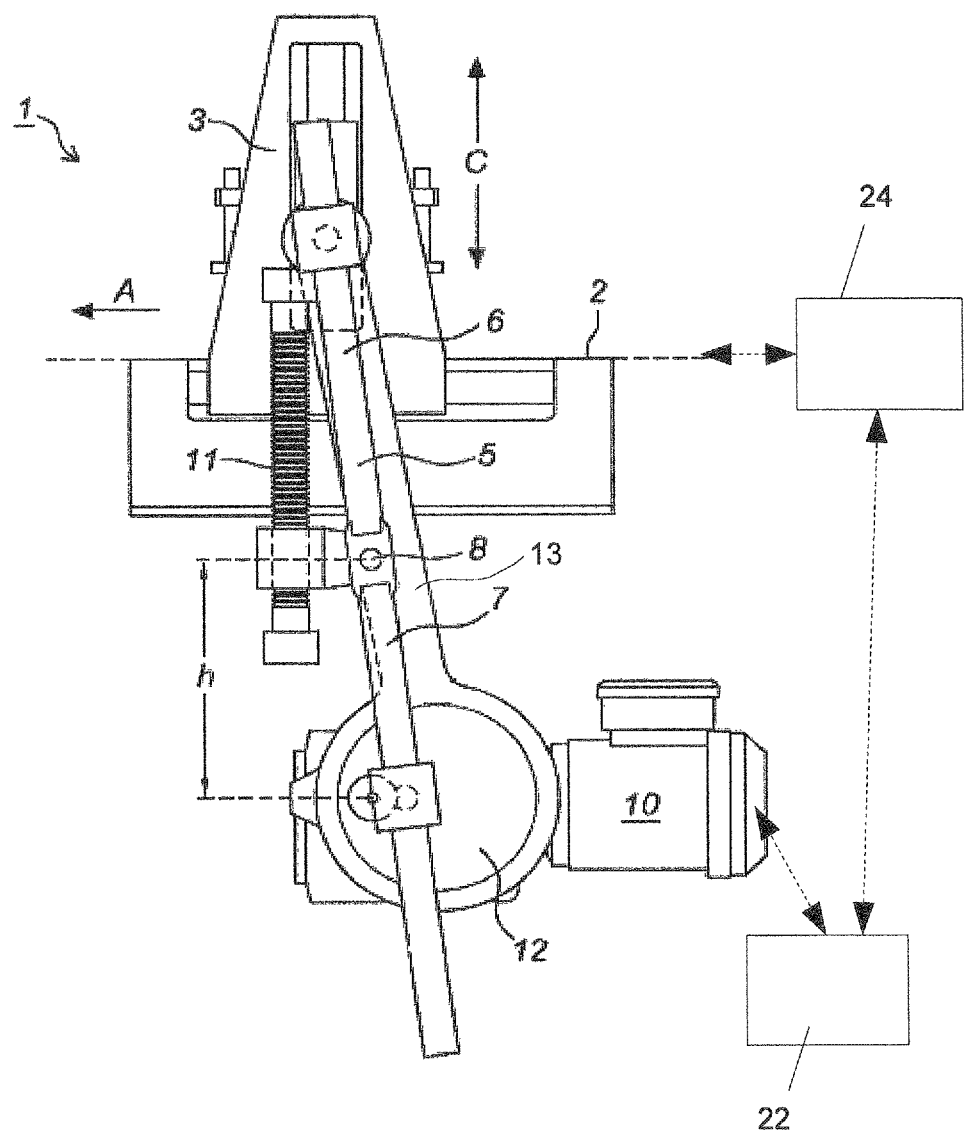
FIG. 1b shows a side view of the embodiment from FIG. 1a, in which the first arm, the first arm part, the second arm part, and the fulcrum are shown in different positions.

FIG. 1a shows a device 1 for cutting dough, comprising a conveyor 2 for conveying an elongated or endless dough piece (not depicted) via a conveying means 24 in an essentially horizontal direction A. The device comprises a slide 3, arranged translatable in the essentially horizontal direction A', A" of conveyance A of the conveyor 2. The device has a cutting blade 4, extending B horizontally and essentially perpendicular to the direction A of conveyance of the conveyor, and coupled to the slide 3, translatable in an essentially vertical direction C. The device further comprises an arm 5 extending essentially vertically, with a first arm part 6 extending above a fulcrum 8, and a second arm part 7 extending below the fulcrum 8, wherein the first arm part 6 is coupled to the slide 3, and the second arm part 7 coupled to a drive 10 for rocking the arm 5 about the fulcrum 8. The drive 10 also serves for translating the cutting blade 4 in the essentially vertical direction C with respect to the slide 3, by means of rod 13, coupled to eccentric cam 12 (and free from fulcrum 8). In order to adjust the swing of the slide 3, the vertical position of the fulcrum 8 is adjustable over a height h, with respect to the coupling of the second part 7 of the arm and the drive 10. The height h may for instance be varied between 230 and 410 mm, which can be done automatically, by means of rotating spindle 11. The shaft 15 of the drive 10 is provided with counter-weights 14, to compensate for at least the horizontal forces occurring from the arm and the eccentric cam 12 and rod 13 with slide 3. In order to ease the use of the device, and to facilitate incorporation in a dough line, the device may comprise a controller 22, for controlling the first and/or second drive, the controller 22 configured for setting the drive at uninterrupted movement. FIG. 1b shows a side view of the same device.

Figure 2:
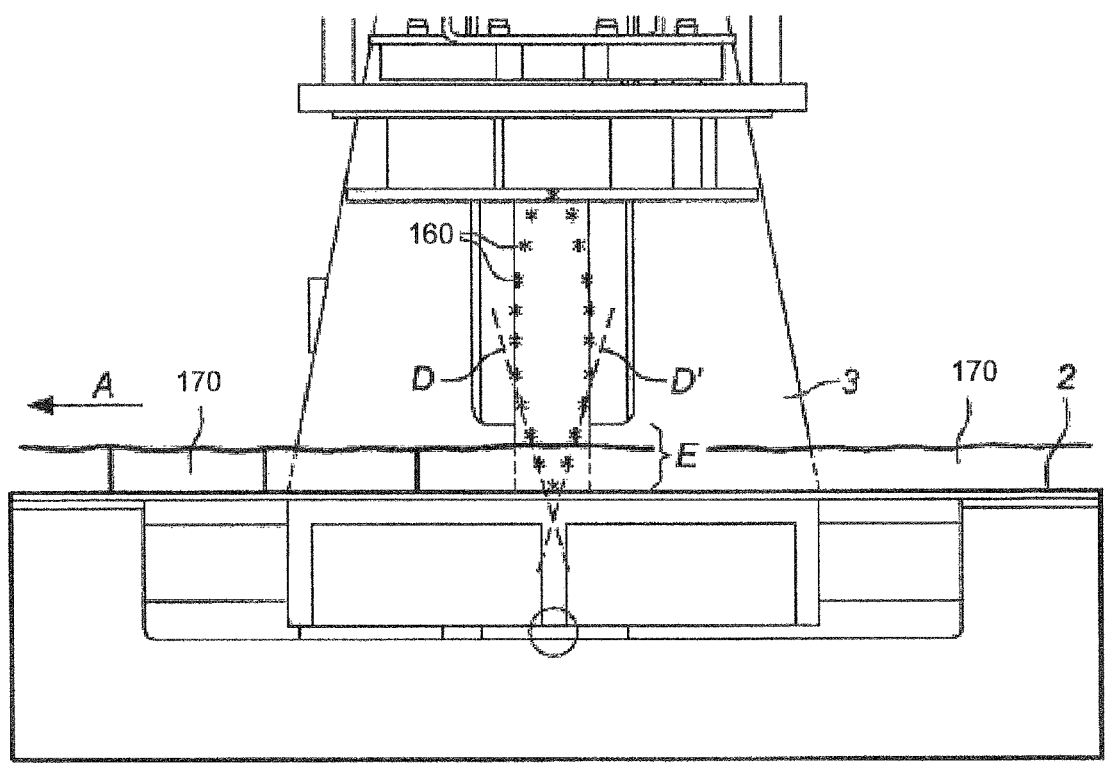
FIG. 2 shows a trajectory of the cutting blade in a device from FIGS. 1a, b.

FIG. 2 shows with * shaped indications 160 the path of the cutting blade 4 (not visible) from the device from FIG. 1a, b. As can be seen in the figure, the interaction of the momentum and the eccentric cam and rod 12, 13 cause the blade to move along a trajectum that has essentially straight curve-parts D, D' towards the conveyor 2. In particular when encountering the dough 170 over a thickness E, which may for instance be 3-5 centimeters, the curve is straight, so that the cutting blade travels in the direction of conveyance along with the dough 170 when cutting, in an exactly determined speed relative to the conveyor, which may in particular be the same speed.

Figure 3:
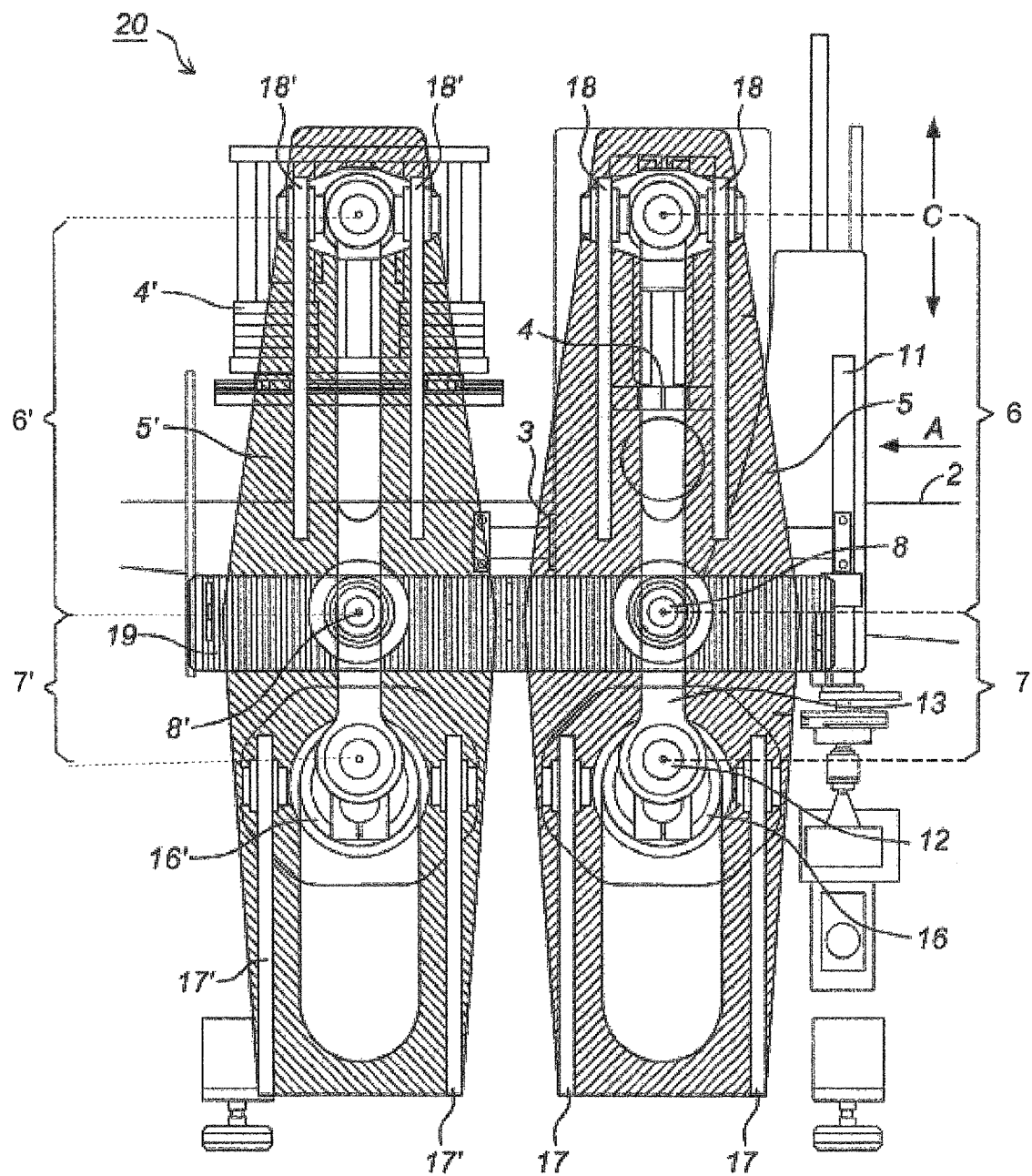
FIG. 3 shows a side view of a second embodiment of the present invention.

FIG. 3 shows a second embodiment 20 of the device according to the present invention.

Also this embodiment comprises a conveyor 2 for conveying an elongated or endless dough piece in an essentially horizontal direction A, and a slide 3, translatable in the essentially horizontal direction of conveyance of the conveyor, a cutting blade 4, extending horizontally and essentially perpendicular to the direction of conveyance of the conveyor, and coupled to the slide, translatable in an essentially vertical direction C, a first arm 5 extending essentially vertically, with a first arm part 6 extending above a fulcrum 8, and a second arm part 7 extending below the fulcrum 8, the first arm part 6 coupled to the slide 3, and the second arm part coupled to a first drive (not visible), coupled to eccentric cam 16 for rocking the arm 5 about the fulcrum 8.

A second eccentric cam 12 is present, for translating the cutting blade 4 in the essentially vertical direction C with respect to the slide 3, by means of rod 13. The vertical position of the fulcrum 8 is adjustable, with respect to the coupling of the first part 6 of the arm to the slide 3, and with respect to the coupling of the second part 7 of the arm and the drive. The vertical position of the fulcrum 8 is steplessly adjustable by an actuator, formed by controllable adjusting spindle 11.

The vertical position of the fulcrum is adjustable by lifting a frame 19 in which the arm is beared rotatably about the fulcrum. The first arm part is coupled to the slide by a guide bearing 18, and the drive for rocking the arm comprises an eccentric cam 16, wherein the second arm part 7 is coupled to the eccentric cam 16 by a guide bearing 17.

The first arm part 6' of the second arm 5' is coupled to the slide by a guide bearing 18', and the drive for rocking the arm comprises an eccentric cam 16', wherein the second arm part of the second arm is coupled to the eccentric cam 16' by a guide bearing 17'.

The device 20, and in particular the drive is balanced, for compensating the inertia of a horizontal and/or vertical movement. Thereto, a second arm 5', 8' is present, for counterbalancing at least a vertical component of the inertia of the first arm 5, 6, 7, 8. To compensate for the weight of the slide 3 and the cutting blade 4, a weight 4' is coupled slideably along guide bearing 18'. The second arm is configured to make synchronous but opposite movements with respect to the first arm, which is achieved by having excentre 16' rotate with the same speed, but oppositely to excentre 16. As can be seen in the figure, the balance is optimised by having the first and the second arm essentially same-shaped.

This enables setting the drive at uninterrupted movement, with which a frequency above 150 cuts/minute, and more in particular more than 200 cuts/minute, and especially between 250 and 300 cuts/minute have appeared to be obtainable. The speed of conveying the dough piece in horizontal direction may be then set equal to the speed of the horizontal speed component of the slide.

Besides an uninterrupted movement, the device according to the present invention may be configured for interrupted operation, that is, discontinuously driving the slide and the cutting blade while the conveyor continues conveying dough. This way, relatively long products may be made in case this is desired, without the need of using another device.

The invention claimed is:

1. A device for cutting dough, comprising,
    a conveyor for conveying an elongated or endless dough piece in a direction with at least a horizontal component;
    a cutting blade;
    a slide, arranged translatable in the direction of conveyance of the conveyor;
    wherein the cutting blade is coupled to the slide, translatable in a vertical direction;
    a first arm extending vertically, with a first arm part extending above a fulcrum, and a second arm part extending below the fulcrum, the first arm part coupled to the slide;
    a drive, wherein the second arm part is coupled to the drive for rocking the first arm about the fulcrum; and wherein the drive is operably configured to translate the cutting blade in the vertical direction with respect to the slide;
    and further wherein the vertical position of the fulcrum is adjustable, with respect to the coupling of the first part of the arm to the slide, with respect to the coupling of the second part of the arm and the drive, or with respect to the coupling of the first part of the arm to the slide and with respect to the coupling of the second part of the arm and the drive.

2. The device according to claim 1, wherein the vertical position of the fulcrum is steplessly adjustable.

3. The device according to claim 1, wherein the vertical position is adjustable by an actuator, such as a controllable adjusting spindle, operatively connected to the fulcrum.

4. The device according to claim 2, wherein the vertical position of the fulcrum is adjustable by lifting a frame operatively connected to the fulcrum, in which the first arm is beared rotatably about the fulcrum.

5. The device according to claim 1, wherein the first arm part is coupled to the slide by a guide bearing.

6. The device according to claim 1, wherein the drive for rocking the arm is operably coupled to a first eccentric cam, and wherein the second arm part is coupled to the first eccentric cam by a guide bearing.

7. The device according to claim 1, wherein the drive for translating the cutting blade comprises a second eccentric cam, coupled to the cutting blade by means of a rod.

8. The device according to claim 1, wherein the drive is balanced for compensating the inertia of a horizontal and/or vertical movement.

9. The device according to claim 1, comprising a second arm coupled to a frame, for counterbalancing at least a vertical component of the inertia of the first arm that is also coupled to the frame.

10. The device according to claim 9, wherein a second moment created by the second arm is configured to make synchronous but opposite movements with respect to a first moment created by the first arm.

11. The device according to claim 9, wherein the first and the second arm are essentially same-shaped.

12. The device according to claim 1, comprising a controller, for controlling the drive, the controller configured for setting the drive at uninterrupted movement.

13. The device according to claim 12, wherein the controller is configured for setting the drive to translate the cutting blade in the essentially vertical direction with a frequency above 150 cuts/minute, and more in particular more than 200 cuts/minute, and especially between 250 and 300 cuts/minute.

14. The device according to claim 12, wherein the controller is configured for setting the speed of conveying the dough piece in horizontal direction to the speed of the horizontal speed component of the slide.

15. The device according to claim 12, wherein the controller is configured for discontinuously operating the movement of the slide and/or the cutter.

* * * * *